May 16, 1933.  Q VAN CLEMENS  1,908,875
FLUSHING DEVICE
Filed March 31, 1930
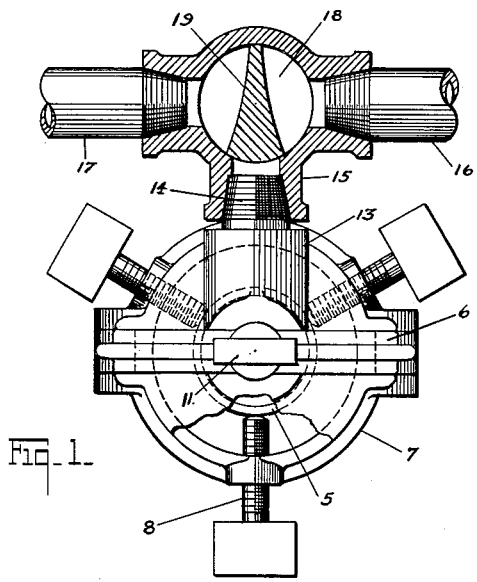
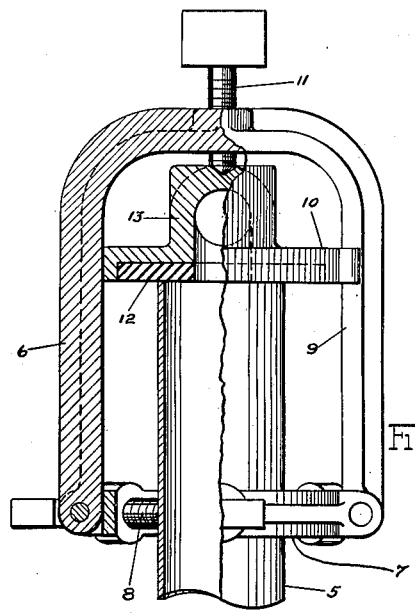
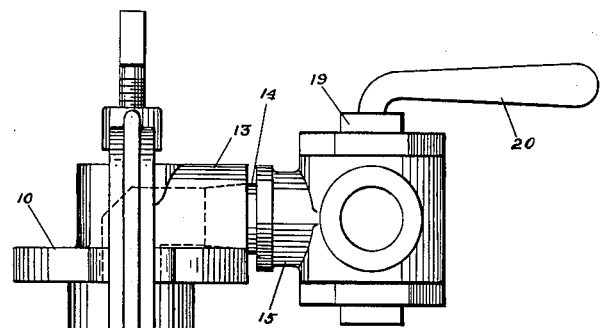
Inventor
Q Van Clemens,
By   Owen + Owen,
Attorneys Patented May 16, 1933

1,908,875

UNITED STATES PATENT OFFICE

Q VAN CLEMENS, OF FINDLAY, OHIO

FLUSHING DEVICE

Application filed March 31, 1930. Serial No. 440,543.

This invention relates to a flushing device adapted to be attached to a pipe for washing out sediment therefrom or from a system with which the pipe is connected.

The object of the invention is to provide means by which there is effected a circulation of water or other cleansing fluid through the system to be flushed and also a vigorous agitation of the same, air being introduced into the system to facilitate such agitation and to improve its cleansing effect. The invention also includes various novel features of construction which facilitate the application and use of the device, as will more fully appear from the following detailed description.

In the accompanying drawing,

Figure 1 is a plan view of the invention with parts broken away or shown in section.

Figure 2 is a side view partly in elevation and partly in section.

Figure 3 is a side elevation taken at right angles to Figure 2.

The invention is illustrated in connection with a pipe 5 leading to the system which is to be flushed. For example, in connection with the cooling system of an internal combustion motor, the device may be attached to the pipe which projects from the upper portion of the cylinder block and which is usually connected to the radiator by a piece of hose.

For attaching the device to the pipe 5, there is provided a cage comprising a yoke 6 with a ring 7 secured to its arms and adapted to encircle the pipe 5. Radially disposed thumb screws 8, or similar means, are connected to the ring 7 for centering the cage with respect to the pipe 5. The arms of the yoke 6 are formed with oppositely disposed guideways 9 for guiding a follower 10 which is adapted to engage the end of the pipe 5. After the cage is mounted on the pipe 5, the follower 10 is adjusted to meet the end of the pipe by means of a thumb screw 11 or the like connected with the central part of the yoke.

The follower 10 is provided with a gasket 12 to form a water tight connection with the end of the pipe 5. The follower is formed with an elbow 13 having a passageway therethrough and connected by means of a nipple 14 to a three way housing or T 15. Two inlet pipes 16 and 17 are connected with the T 15 and are adapted respectively to supply air and water under pressure to the system to be flushed. The T or housing 15 is formed with a valve chamber 18 in which is disposed a valve 19 having a handle 20 by means of which it may be manipulated to selectively supply water or air to the system.

In the operation of the flushing device, the cage 6 is mounted on the end of the pipe 5 and centered by means of the screws 8 and the follower 10 adjusted to meet the end of the pipe. The pipes 16 and 17 are connected to suitable sources of water and air under pressure and the valve 19 is then manipulated to introduce water and air alternately into the system in suitable proportions to accomplish the desired result. The introduction of air to a system only partly filled with water permits a violent agitation of the water within the system so that the later is thoroughly scoured and all sediment removed therefrom.

While I have shown and described in detail the preferred embodiment of the invention, it will be understood that the same may be considerably modified without departing materially from the scope of the appended claim.

What I claim is:

A pipe connection comprising a yoke with two parallel legs adapted to straddle the end of a pipe, a ring mounted in the ends of said legs and disposed in a plane perpendicular to the plane of the legs, three or more screws mounted radially in said ring and adapted to engage the pipe to secure the ring in concentric relation thereto, a follower guided longitudinally of the legs and provided with a gasket to engage the end of the pipe, and a screw mounted centrally of the yoke and operable to engage the follower and to force it into sealing relation to the end of the pipe after the ring is secured thereto, said follower being provided with an inlet leading into the pipe when the follower is thus secured.

In testimony whereof I have hereunto signed my name to this specification.

Q VAN CLEMENS.